May 12, 1964 K. B. HAYSLER ETAL 3,132,791
FLOWER POT
Filed Nov. 13, 1961 2 Sheets-Sheet 1

INVENTORS
Kenneth B. Haysler
Margarette L. Haysler
BY
Scofield, Kolyer, Scofield & Lowe
ATTORNEYS.

INVENTORS.
Kenneth B. Haysler
Margarette L. Haysler
BY Scofield, Kohjen, Scofield & Lowe
ATTORNEYS.

3,132,791
FLOWER POT
Kenneth B. Haysler and Margarette L. Haysler, both of 10550 Wornall Road, Kansas City, Mo.
Filed Nov. 13, 1961, Ser. No. 151,951
7 Claims. (Cl. 229—21)

This invention relates to flower pots and methods of making same and refers more particularly to flower pots which may be shipped in a flat blank form and assembled at the point of use.

This application is an improvement over the flower pot structure and assembly of Patent 2,073,695, issued March 16, 1937 "Flower Pot and Method of Making Same," inventors Kenneth and Ernest Haysler.

It is previously known, particularly from the above-cited patent, to provide a flower pot in flat blank form for shipment, handling and storage, the said flower pot to be assembled at the point of use by the user. Alternatively, the known flower pot can be assembled ahead of time and shipped in nested form, but this is not the most efficient and practical way of storage or transportation. The Haysler patent teaches the provision of a strip of flexible material which may be formed into a tube circular in cross section, the tube stapled down the seam to form the body of the container. The bottom of the known art flower pot is formed from a row of parallel straight slits originally cut in or formed from the longitudinal edge of the strip. During assembly the strip is formed into a tube circular in cross section, the seam stapled, and then the bottom is formed by bending all of the said flaps diametrically inward, whereby they will overlap one another and form the bottom of the pot. This particular prior art patent additionally discloses the shortening of the flaps whereby to provide a small drainage opening centrally of the bottom of the pot. The flaps are not secured to one another.

An object of the instant invention is to provide an improved flower pot of the type which may be readily assembled from a single blank form.

Another object of the invention is to provide a blank form for an assemblable flower pot which permits cheap, easy, safe shipment, handling and storage of large numbers of same, while yet providing an easily assemblable flower pot of efficient useful construction, after assemblage.

Another object of the invention is to provide a flower pot of the character described wherein the bottom structure is of greatly improved strength, integrity and utility.

Another object of the invention is to provide a flower pot and method of assembling same wherein a flower pot body is formed from a strip of material, the strip stapled or otherwise secured along a seam to form a circular cross section tube, the bottom formed of a plurality of layers of overlapping flaps, some of which are engageable and disengageable with one another.

Another object of the invention is to provide a flower pot construction and method of assembling same wherein the bottom construction may be engaged for use or disengaged thereafter as desired without damaging the pot.

Another object of the invention is to provide an extremely cheap, useful, rugged flower pot which may be formed from a single blank without any additional aids save a stapling machine or the equivalent.

Another object of the invention is to provide an improved flower pot and method of making and assembling same wherein the body of the flower pot may either taper from a larger diameter top to a lesser diameter bottom or be provided in a uniform internal diameter shape in the body thereof.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

Figure 1:
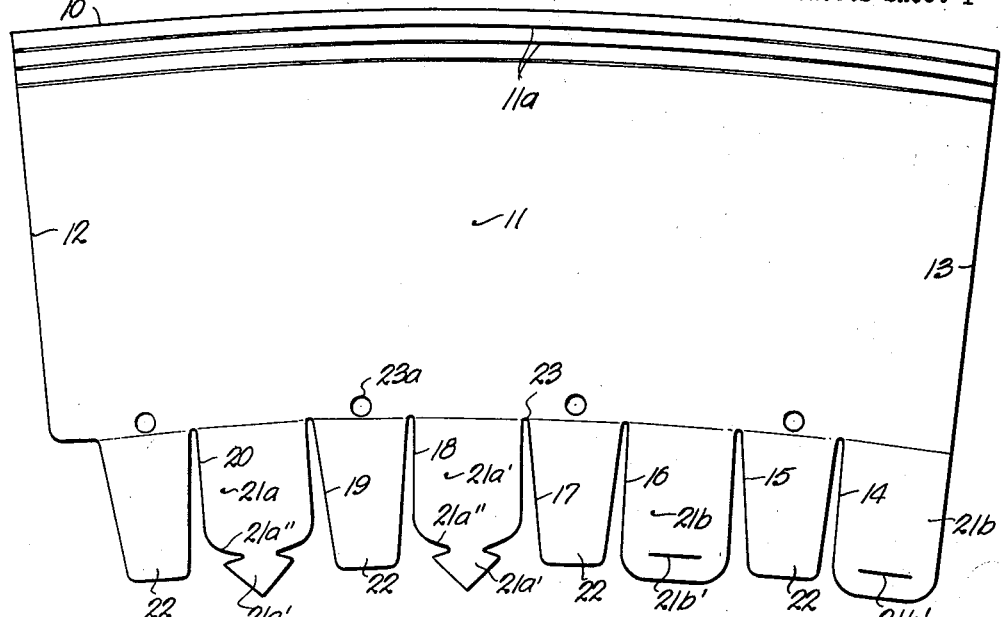
FIG. 1 is a side view of the blank for a first form of flower pot before assembly or setting up.
Figure 2:
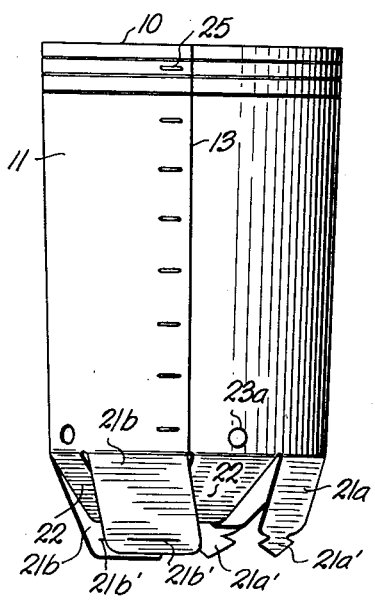
FIG. 2 is a view from the side of the partly assembled flower pot blank of FIG. 1, the strip of flexible material forming the body of the pot having been stapled down the seam thereof to form a substantially cylindrical body portion, the tongues or flaps of the base not yet interengaged.

Referring to the drawings, at 10 is seen the upper edge of an elongate strip 11 of suitable flexible material such as waterproofed cardboard or the like having substantially vertical side edges 12 and 13. A series of slots or slits 14–20, inclusive, are provided in the lower portion of the strip 11 whereby to define two sets of flaps designated (1) 21a and 21b and (2) 22, respectively. The slits may be angled from a lesser width adjacent their closed ends to a greater width adjacent their open ends, as shown, or, alternatively, may be simple cuts between the two sets of flaps without separation therebetween. In the latter case, it is desirable that the lower edge 23 of the strip 11 defined by the top of the slits be a substantially straight line parallel to a substantially straight line top 10 with side walls 12 and 13 substantially normal thereto. This produces a vertical wall cylindrical pot as in the form of FIGS. 5–8, inclusive. This is not the situation illustrated in FIGS. 1–5 where line 23 and line 10 are essentially arcuate with sides 12 and 13 normal thereto whereby to provide a frusto-conical vessel, when assembled, of a greater diameter in the upper portion thereof than the diameter in the lower portion thereof.

Figure 3:
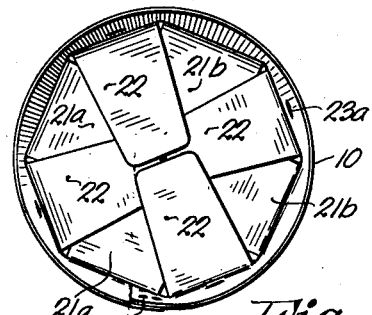
FIG. 3 is a top view of the completely assembled flower pot of FIGS. 1 and 2.
Figure 4:
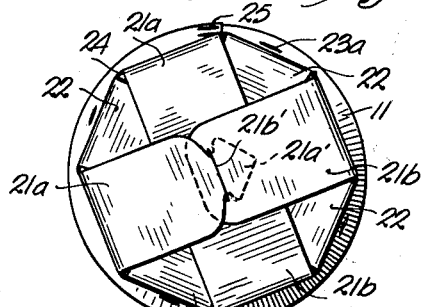
FIG. 4 is a bottom view of the completely assembled flower pot of FIGS. 1–3, inclusive.

Flaps 22 are of lesser length than flaps 21a and 21b but still of sufficient length that they essentially contact or overlap when folded in centrally (see FIG. 3). There are not provided a sufficient number of flaps 22 to provide a complete bottom seal structure.

Flaps 21a and 21b are of greater length and preferably of at least slightly greater width than flaps 22 whereby each opposed pair of flaps 21a and 21b may be, sequentially, engaged at the inward ends thereof whereby to provide a container which is locked across the bottom thereof by a pair of 90° opposed, engaged sets of strips or flaps 21a and 21b, these two sets of strips or flaps 21a and 21b overlying (outwardly) the pair of sets of opposed nonengaged strips or flaps 22. Strips 21a terminate in arrowhead shape portions 21a' defined by a pair of inward cuts 21a" in the side edges of the strips 21a. A slot 21b' is formed in each strip 21b whereby to receive a portion 21a' therein. Slots 21b' are of slightly lesser width than the greatest width of arrow portions 21a'.

A plurality of openings 23 may be optionally provided at the base of the container wall strip 11 whereby to permit drainage of excess water therefrom without relying upon drainage through the bottom. Very slight gaps or slots 24 may be present at the bottom peripheral edge of the container, after assembly, where the wider slots 14–20 are employed as shown in FIG. 1, instead of simple cuts. However, these openings are not sufficiently large to hazard any loss of dirt from the container and in most cases are not sufficient for drainage if such is desired.

The container is first assembled by bending the strip 11 upon itself to form a frusto-conical or cylindrical shape whereby the edges 12 and 13 may be stapled as at 25 down the length thereof to provide the container body. Following this, strips 22 may be bent inwardly, one opposed pair at a time, whereby one opposed pair thereof overlies the adjacent pair, followed by the sequential inward bending and engagement of opposed pairs of strips 21. To reopen the bottom of the pot, the assembly sequence is simply reversed.

Referring to FIGS. 5–8, inclusive, at 30 is seen the upper edge of elongate strip 31 of suitable flexible material such as waterproof cardboard or the like having vertical side edges 32 and 33. A plurality of vertical fold lines 31a are provided paralleling side edges 32 and 33 at regularly spaced intervals thereacross. A series of slots or slits 34–40, inclusive, are provided in the lower portion of the slit 31 whereby to define two sets of flaps designated (1) 41a and 41b and (2) 42, respectively. The slots may be angled from a lesser width adjacent their closed ends to a greater width adjacent their open ends, as shown, or, alternatively, may be simple cuts between the two sets of flaps without separation therebetween. The construction of FIGS. 5–8, inclusive, illustrates a vertical wall cylindrical pot.

Figure 7:
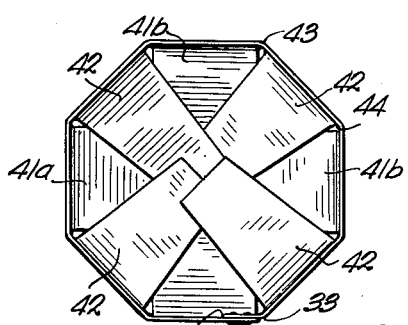
FIG. 7 is a top view of the completely assembled flower pot of FIGS. 5 and 6.
Figure 8:
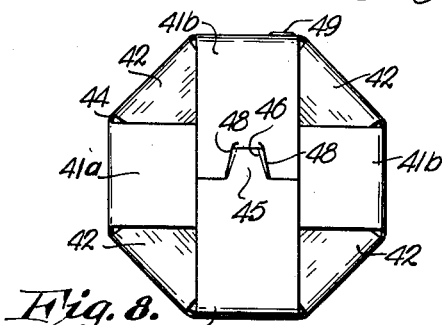
FIG. 8 is a bottom view of the completely assembled flower pot of FIGS. 5–7, inclusive.

Flaps 22 are of lesser length than flaps 21a and 21b, but are still of sufficient length that they essentially contact or overlap when folded in centrally (see FIG. 7). There are provided a sufficient number of flaps 42 to provide a complete bottom seal structure, it being necessary that the flaps of the 41 set cooperate therewith to provide this.

Flaps 41a and 41b are of greater length and preferably of at least slightly greater width than flaps 42 whereby each opposed pair of flaps 41a and 41b may be, sequentially, engaged at the inward ends thereof whereby to provide a container which is locked across the bottom thereof by a pair of 90° opposed, engaged sets of strips or flaps 41a and 41b, these two sets of strips or flaps 41a and 41b overlying (outwardly) the pair of sets of opposed nonengaged strips or flaps 42.

Figure 5:
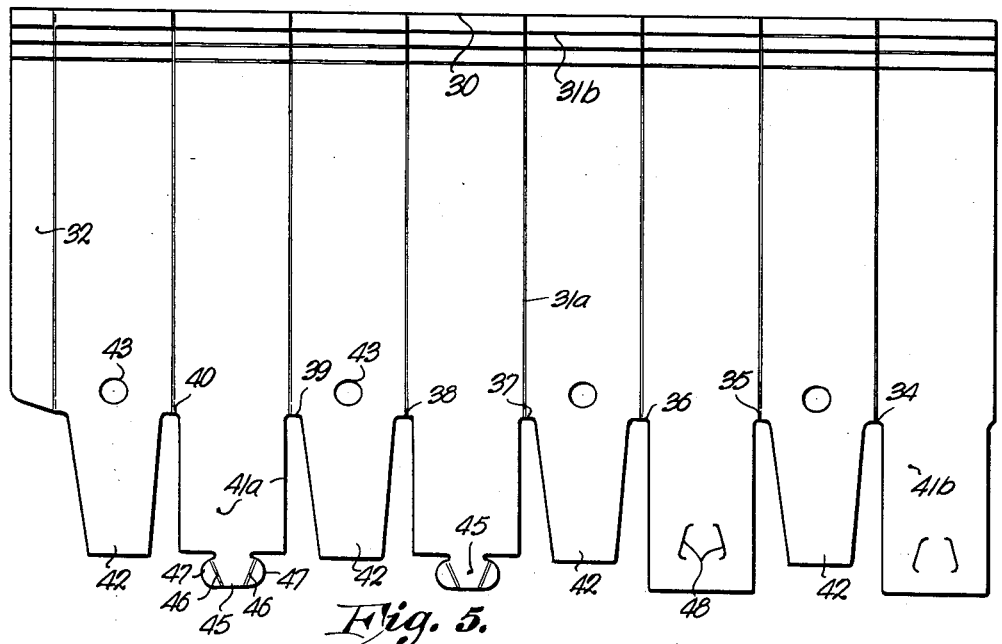
FIG. 5 is a side view of the blank for a second form of flower pot before assembly or setting up.
Figure 6:
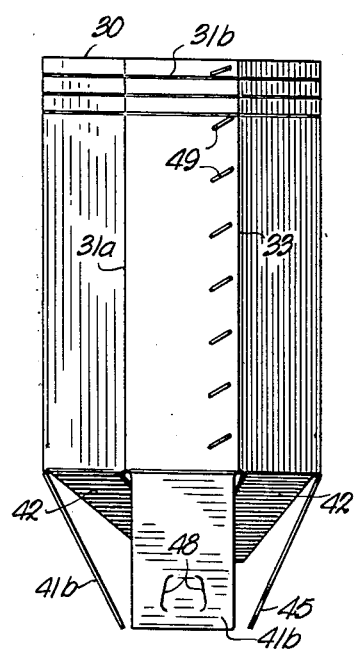
FIG. 6 is a view from the side of the partly assembled flower pot blank of FIG. 5, the strip of flexible material forming the body of the pot having been stapled down the seam thereof to form a substantially cylindrical body portion, the tongue or flaps of the base not yet interengaged.

A plurality of openings 43 may be optionally provided at the base of the container wall strip 31 whereby to permit drainage of excess water therefrom without relying upon drainage through the bottom. Very slight gaps or slots 44 may be present at the bottom peripheral edge of the container, after assembly, where the wider slots 34–40 are employed as shown in FIG. 5, instead of simple cuts between the strips. However, these openings are not sufficiently large to hazard any loss of dirt from the container and in most cases are not sufficient for drainage if such is desired.

At the lower ends of strips 41a in FIG. 5, their inward ends are provided tabs 45 having fold lines 46 defining the outward ears 47 thereof. On strips 41b, which in total length are substantially equal to the total length of strips 41a including tabs 45, are provided paired slots or cuts 48 adapted to receive and engage ears 47, when the latter are bent along fold lines 46. The spacing of cuts 48 on tabs 41b are such as to provide the engagement of FIG. 8 with the 41 set of flaps or strips lying normal to the walls of the container, and flat against the strips 42 when the latter are folded in. The ears 47 fold flat after insertion through the cuts 48 to provide a positive yet removable engagement of the strip set 41.

A plurality of inwardly indented grasping lines 11a and 31b are provided running parallel to the upper edges 10 and 30, respectively, of strips 11 and 31 in FIGS. 1 and 5. Such lines aid the user in grasping the parts and carrying same, even when filled with dirt as the dirt conventionally does not rise to that level. Such grasping means may be either grooved lines or raised ridges, but preferably the former, which is shown. Such grasping means also preferably run circumferentially around the top of the container.

The assembly of the container of FIGS. 5–8 is much similar to the assembly described relative to the modification of the other figures. Thus, the container assembly is commenced by bending the strip 31 upon itself to form an essentially frusto-conical or cylindrical shape whereby the edges 32 and 33 may be stapled as at 49 down the length thereof to provide a container body. However, this modification provides an essentially octagon or octagonal shaped body due to the crease or fold lines 31a. Following the stapling, strips 42 are bent inwardly, one opposed pair at a time, whereby one opposed pair thereof overlies the adjacent pair. This is then followed by the sequential inward bending and engagement of opposed pairs of strips 41a and 41b. To reopen the bottom of the pot, the assembly sequence is simply reversed. To disengage the ears 47 from the cuts 48, the user merely grasps the free end of the tab 45 which is exposed and pulls it outwardly from the bottom to disengage the said tabs.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A flower pot comprising a strip of flexible material adapted to be formed into a tube circular in cross section, said strip having a row of slits in one longitudinal edge thereof whereby to form a longitudinal row of flaps, the slits having lengths such that, when all said flaps are bent diametrically inwardly at the inner end of said slits, the flaps will overlap each other to form the bottom of the pot at the lower end of the wall thereof, and the inner ends of diametrically opposite flaps will be also overlapping whereby to provide a sealed lower end, each said slit having one edge thereof running substantially parallel to the end edges of the strip and the other edge thereof angled from said parallel to be of asymmetric V-shape alternate ones of said flaps of greater length than the adjacent flaps thereto and means integral with the end portions of each one of said longer flaps for engagement of each one of said longer flaps with another said longer flap the longer flaps of greater width than the lesser length flaps and of uniform width throughout their length, the lesser length flaps tapering from a greater width adjacent their attached bases to a lesser width at their free ends, whereby the lesser length flaps are foldable inside and above the greater length flaps and rest thereon after attachment of the ends of the latter to one another.

2. A flower pot as in claim 1 including four lesser width flaps and four greater width flaps, the latter the greater length flaps.

3. A flower pot as in claim 1 wherein the strip of flexible material is rectangular in form.

4. A flower pot as in claim 1 wherein the strip of flexible material is arcuate in form whereby to form a tapered vessel when assembled.

5. A flower pot as in claim 1 wherein the engagement means comprises a slot in one longer flap of each opposed pair thereof and a shaped engaging tab on the end of the other opposed longer flap.

6. A flower pot as in claim 1 wherein the engagement means comprises a pair of slots in one longer flap of each opposed pair thereof and a shaped engaging tab on the end of the other opposed longer flap.

7. A flower pot as in claim 1 including grasping aid means circumferentially provided on said strip adjacent the non-flap carrying end thereof, said grasping aid means comprising a plurality of ridges formed in the face of the blank and substantially paralleling the top edge thereof.

References Cited in the file of this patent

UNITED STATES PATENTS

| | | |
|---|---|---|
| 1,425,549 | Scruby | Aug. 15, 1922 |
| 2,073,695 | Haysler et al. | Mar. 16, 1937 |
| 2,189,436 | Rosenfeld | Feb. 6, 1940 |
| 2,271,455 | Finn | Jan. 27, 1942 |